United States Patent
Erickson et al.

(10) Patent No.: US 9,797,922 B2
(45) Date of Patent: *Oct. 24, 2017

(54) SCANNING PROBE MICROSCOPE HEAD DESIGN

(71) Applicant: Angstrom Science, Inc., Goleta, CA (US)

(72) Inventors: Andrew Norman Erickson, Santa Barbara, CA (US); Stephen Bradley Ippolito, Saint Petersburg, FL (US)

(73) Assignee: Angstrom Science, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,560

(22) Filed: Feb. 18, 2016

(65) Prior Publication Data

US 2016/0202288 A1    Jul. 14, 2016

Related U.S. Application Data

(63) Continuation-in-part of application No. 14/805,679, filed on Jul. 22, 2015, now Pat. No. 9,366,695.

(60) Provisional application No. 62/027,385, filed on Jul. 22, 2014, provisional application No. 62/293,587, filed on Feb. 10, 2016.

(51) Int. Cl.
| | |
|---|---|
| *G01Q 70/08* | (2010.01) |
| *G01Q 70/14* | (2010.01) |
| *G01Q 70/16* | (2010.01) |
| *G01Q 20/02* | (2010.01) |
| *G01Q 60/24* | (2010.01) |
| *G01Q 60/38* | (2010.01) |
| *G02B 6/255* | (2006.01) |
| *G02B 6/26* | (2006.01) |
| *G02B 6/36* | (2006.01) |

(52) U.S. Cl.
CPC .............. *G01Q 20/02* (2013.01); *G01Q 60/24* (2013.01); *G01Q 60/38* (2013.01); *G02B 6/2551* (2013.01); *G02B 6/262* (2013.01); *G02B 6/3624* (2013.01)

(58) Field of Classification Search
CPC .... G02B 6/2551; G02B 6/262; G02B 6/3624; G01Q 20/02; G01Q 60/24; G01Q 70/00; G01Q 70/08; G01Q 70/14; G01Q 70/16
USPC .......................... 850/52, 55, 56, 57, 58, 59
See application file for complete search history.

(56) References Cited

U.S. PATENT DOCUMENTS

| | | | | |
|---|---|---|---|---|
| 2012/0080612 A1* | 4/2012 | Grego | ................ | G02B 26/0858 250/458.1 |
| 2014/0130214 A1* | 5/2014 | Solgaard | ................ | B82Y 35/00 850/40 |
| 2016/0025771 A1* | 1/2016 | Erickson | ................ | G01Q 20/02 850/6 |

* cited by examiner

*Primary Examiner* — Nicole Ippolito
(74) *Attorney, Agent, or Firm* — Felix L. Fischer

(57) ABSTRACT

A SPM head incorporates a probe and a cantilever on which the probe is mounted. The cantilever has a planar reflecting surface proximate a free end of the cantilever. The cantilever extends from a mechanical mount and a single-mode optical fiber is supported by the mechanical mount to provide a beam. A micromirror is mounted to reflect the beam substantially 90° to the planar reflecting surface.

8 Claims, 14 Drawing Sheets

SCANNING PROBE MICROSCOPE HEAD DESIGN

REFERENCE TO RELATED APPLICATIONS

This application is a continuation-in-part of application Ser. No. 14/805,679 filed on Jul. 22, 2015 which claims priority of U.S. provisional application Ser. No. 62/027,385 filed on Jul. 22, 2014 entitled SCANNING PROBE MICROSCOPE HEAD DESIGN, and further this application claims priority of provisional application Ser. No. 62/293,587 filed on Feb. 10, 2016 entitled FORCE DETECTION OPTICAL BEAM PATH FOR SCANNED PROBE MICROSCOPE ALLOWING HIGH NUMERICAL APERTURE OPTICAL ACCESS, each having a common assignee with the present application, the disclosures of which are incorporated herein by reference.

BACKGROUND INFORMATION

Field

Embodiments of the disclosure relate generally to the field of scanning probe microscopy and more particularly a head incorporated in a scanning probe microscope incorporating a micromirror introduced between a fiber and a reflecting surface on the cantilever to turn a beam emitted from the fiber by 90° to be perpendicular to the reflecting surface on the cantilever.

Background

A Scanning Probe Microscope (SPM) scans a physical probe relative to an object in order to form an image. This may be achieved by movement of either the probe or the object. In an Atomic Force Microscope (AFM) and its many derivatives, the probe is attached to the end of a cantilever, which is also scanned relative to the object. The force exerted on the probe by interaction with the object, deflects the cantilever. Cantilever deflection is then measured by either optical or electrical methods. Electrical methods, such as piezo-electric detection, piezo-resistive detection, capacitive detection, and scanning tunneling microscopy are rarely used in practice due to sensitivity, complexity, and cost limitations. Optical methods measure either the amplitude or phase of light to determine cantilever deflection. Measuring the phase of light requires interference with a reference beam to transform the phase shift into an amplitude shift prior to photo-detection. Optical interferometry methods are also rarely used in practice due to sensitivity, complexity, and cost limitations. Detecting changes in the amplitude of light is the simplest and therefore most commonly used method for measuring cantilever deflection.

In standard cantilever SPM, light from a laser is reflected near the end of the cantilever and its amplitude is measured by a position sensitive detector. The planar reflection surface may be the cantilever itself or a mirror mounted on the cantilever. The cantilever mechanically transforms the magnitude of the force exerted on the probe into angular displacements of the reflecting surface. Reflection then transforms these angular displacements of the reflecting surface into angular displacements of the optical beam that are twice as large. Propagation away from the reflecting surface transforms these angular displacements into spatial displacements of the optical beam, which are then measured by the position sensitive detector.

Most standard cantilever SPM designs have a large head that includes the laser, detector, and a mechanical structure to attach them to the cantilever base. Vibration and drift in this mechanical structure create additional angular and spatial displacements, which limit sensitivity to the small angular displacements associated with probe forces. In object-scanning cantilever SPM, reducing the head size offers several advantages. The primary advantage is improved immunity to vibration and drift. Another advantage is the ability to meet the head size and mass budget associated with certain applications. For example, in SPM applications with an optical microscope, smaller dimensions permits the use of high numerical aperture objectives with short working distance, thereby improving spatial resolution and collection efficiency. In head-scanning cantilever SPM, reducing the head size offers additional advantages beyond those already described. One additional advantage is that the resonance frequencies and associated head scan rates can be significantly increased. Another additional advantage is that the size of the piezo and motor drive elements and their associate power requirements can be reduced.

The optical path in a cantilever SPM can be divided into two or more independent subsystems by guiding light through single-mode optical fiber. Removing the laser and detector from the head and placing them at the tail end of the fiber allows the dimensions of the head to be significantly reduced and eliminates the internal sources of thermal drift. A single-mode optical fiber can function as a bidirectional waveguide to both deliver the laser light and collect it, so only one fiber is necessary. Light propagating in the fundamental mode of standard single-mode fibers has an electromagnetic field distribution, which can be approximated as a Gaussian amplitude function with planar phase fronts. When launched out of a fiber facet, the field distribution may then be approximately described by Gaussian beam equations, where the beam waist is at the fiber facet. The beam radius is the radius from the optical axis where the optical intensity decreases by a factor of the mathematical constant e squared. The minimum value of the beam radius is at the waist, where it is half of the fiber Mode Field Diameter (MFD). The Rayleigh range is the distance from the beam waist position, along the optical axis, where the optical intensity drops to half of its peak value at the waist.

Single-mode optical fiber has been used in certain SPM head designs to reduce the head size down to just a single-mode optical fiber 102, a mechanical mount 104, and a probe cantilever 106 positioned relative to the single-mode optical fiber by the mount 104, as illustrated in FIG. 1. In these designs, changes in the phase of light, associated with longitudinal displacement of a reflecting surface on the probe cantilever are measured by interfering the returning light with reference light. The reflecting surface is designed to be normal to the beam axis, and therefore return as much light from the reflecting surface back into the fiber, as possible. To maintain reasonable efficiency, the reflecting surface diameter must be greater than the fiber MFD, and the distance between the fiber facet and reflection surface should be significantly less than the Rayleigh range associated with the fiber MFD. In such cantilever translation SPM head designs the fiber mode only acts as a waveguide for the incident and reflected light.

It is therefore desirable to provide scanning probe microscope head, which permits greater working distance between the fiber facet and the cantilever reflection surface, and modulates the amplitude of returning light with angular displacement.

SUMMARY

Embodiments described herein disclose a SPM head having a probe and a cantilever on which the probe is mounted. The cantilever has a planar reflecting surface proximate a free end of the cantilever. The cantilever extends from a mechanical mount and a single-mode optical fiber is supported by the mechanical mount to provide a beam. A micromirror is mounted to reflect the beam substantially 90° to the planar reflecting surface.

The embodiments disclosed additionally provide a method for attaching a micromirror to a fiber in a scanning probe microscopy (SPM) head. A micromirror is supported with a membrane proximate a carrier having a V-groove supporting a fiber. The fiber is urged in the V-groove against the micromirror to deflect the micromirror by distorting the membrane. The micromirror is then glued to the fiber.

The features, functions, and advantages that have been discussed can be achieved independently in various embodiments of the present invention or may be combined in yet other embodiments further details of which can be seen with reference to the following description and drawings.

DETAILED DESCRIPTION

Figure 2:
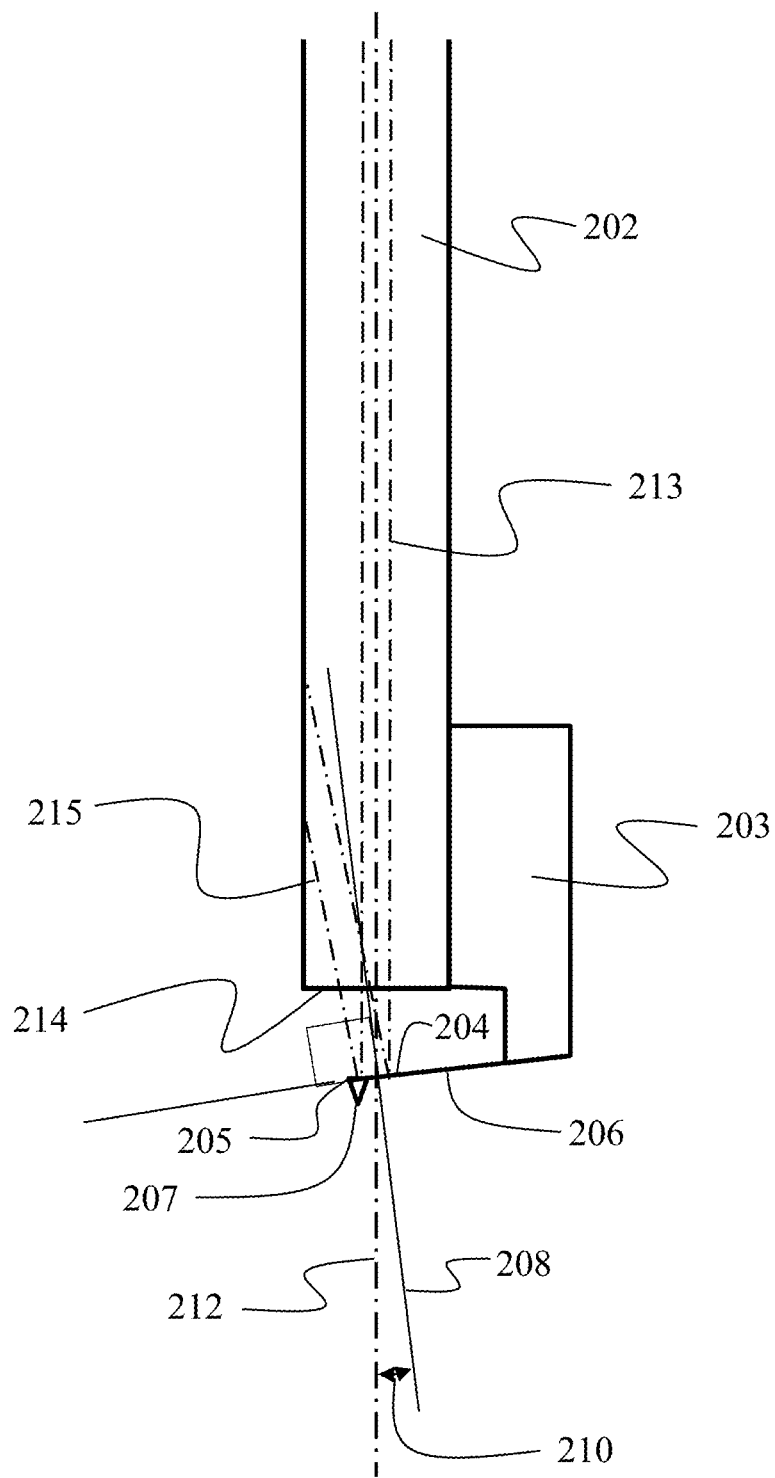
FIG. 2, is a side view representation of a first embodiment of the cantilever rotation SPM head.

For a first embodiment of the scanning probe head described herein a cantilever rotation SPM head is employed as shown in FIG. 2 in which the fiber mode of a single mode fiber 202 also acts as an angular displacement detector, in addition to acting as a waveguide. To accomplish this, an offset angle is introduced between the beam axis and a cantilever reflecting surface normal. In the first embodiment the offset angles is created by a mount 203 mutually supporting the fiber 202 and a reflecting surface 204 of a cantilever 206 supporting a probe 207 near a free end (205) such that a normal 208 to the reflecting surface 204 has an angle 210 with respect to an incident beam axis 212. Thus, the total angle 210 between the beam axis 212 of the incident beam, represented notionally as element 213, and reflecting surface normal 208 are the sum of the initial offset angles and any cantilever displacement angles. A fiber facet 214 is either angled or anti-reflection coated to prevent light reflected by the facet from interfering in the returning fiber mode with light in the reflected beam, represented notionally as element 215, reflected by the reflecting surface of the cantilever. Angling the fiber facet shifts the beam by refraction, and may be also be used as a method of offsetting the beam, in addition to preventing return loss.

The optical power (P) returning from the reflecting surface 204 that is coupled back into the fiber mode is a Gaussian function of the total angle 210, which will hereafter be referred to as θ in mathematical formulae. Calculating the overlap function of the reflected field and the returning fiber mode field yields the following function, where $P_0$ is the power in the incident beam:

$$P_{\{\theta\}} = P_0 e^{-2\frac{\theta^2}{\theta_0^2}}$$

Figure 3B:
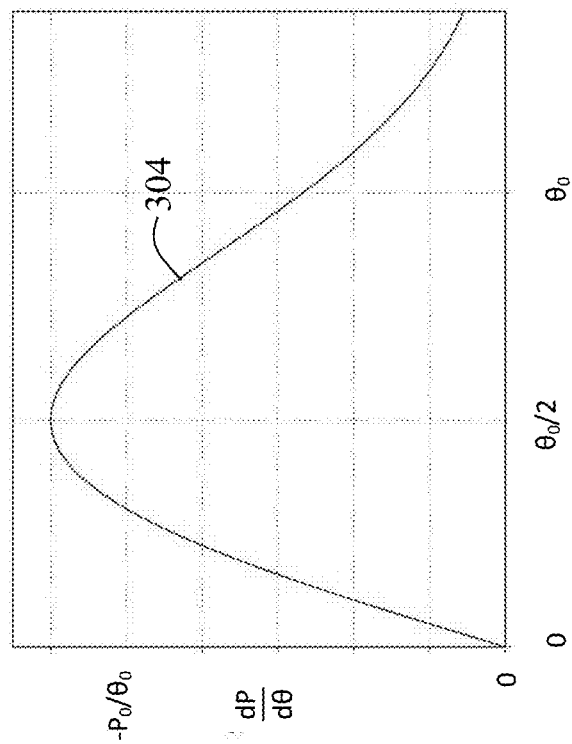
FIG. 3B is a graph of the derivative of the Gaussian function of FIG. 3A showing change in power per unit of displacement angle (dP/dθ), which for small angular displacements represents a small signal magnification value.
Figure 3A:
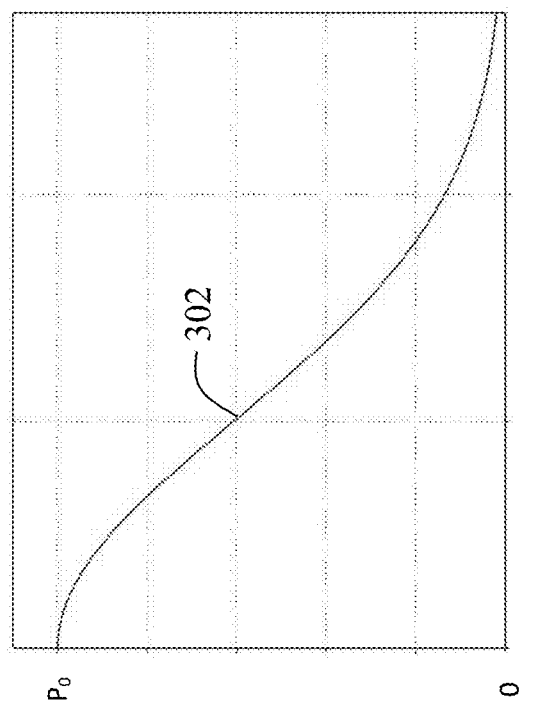
FIG. 3A is a graph of the Gaussian function representing coupling optical power returning from the reflecting surface that is coupled back into the fiber mode.

The optical power (P) is represented by curve 302 in FIG. 3A. The total angle where the power decreases by a factor of the mathematical constant $e^2$ is the divergence angle, which is equal to the wavelength of light divided by the product of the waist radius and the mathematical constant $\pi$. The change in power per unit of angular displacement ($dP/d\theta$) is obtained by taking the derivative of the Gaussian function above, which results in a first order Hermite-Gaussian function that peaks at $\theta_0/2$, or half of the divergence angle:

$$\frac{dP_{\{\theta\}}}{d\theta} = \frac{-4P_0\theta}{\theta_0^2} e^{-2\frac{\theta^2}{\theta_0^2}}$$

The absolute value of the change in power per unit of displacement angle ($|dP/d\theta|$), which for small angular displacements is the small signal magnification value, is represented by curve 304 in FIG. 3B. Increasing the offset angle up to half of the divergence angle therefore decreases the power coupled back into the fiber mode, but increases the sensitivity to small changes in cantilever angle. Increasing the offset angle above half of the divergence angle decreases both the power coupled back into the fiber mode and the sensitivity to small changes in cantilever angle. Operating slightly above or below the divergence angle has little effect on $dP/d\theta$, but significantly alters the background and therefore the signal to noise ratio in some optical detection schemes. Thus, measuring the returning power in the optical fiber mode can replace the functionality of a position sensitive detector simply by introducing an angular offset with an associated loss in power. The efficiency, power, and divergence angle at the reflecting surface all limit the maximized angular sensitivity achievable. For the embodiment shown in FIG. 2 to maintain reasonable efficiency, the reflecting surface diameter must be greater than the fiber MFD, and the distance between the fiber facet and reflection surface should be significantly less than the Rayleigh range associated with the fiber MFD. In order to maximize sensitivity, the divergence angle at the reflecting surface should be reduced by minimizing the optical wavelength, maximizing the reflecting surface diameter, and maximizing the fiber MFD to fill it.

Figure 4:
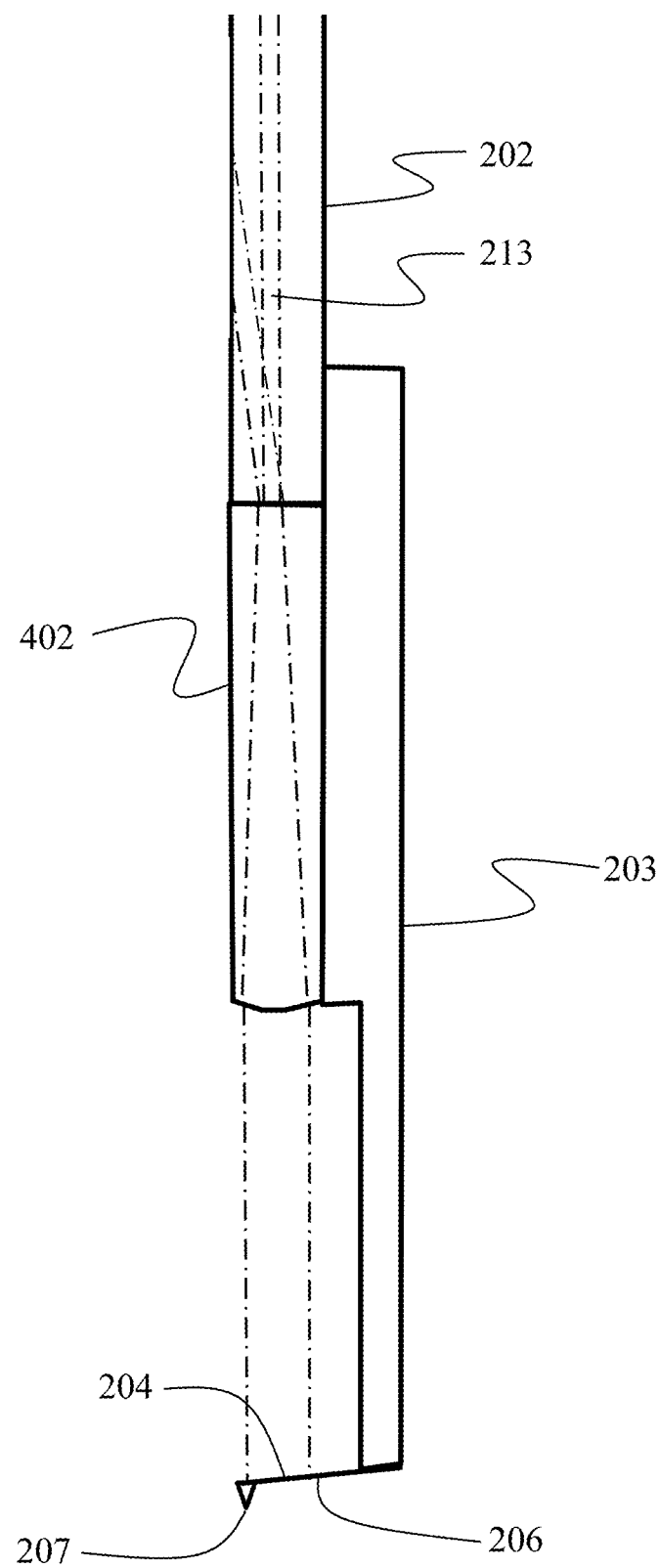
FIG. 4 is a side view representation of a second embodiment of the cantilever rotation SPM head including a coreless fiber lens.

A lens 402 may be employed in certain embodiments as shown in FIG. 4. Adding a lens permits the fiber MFD to be sized independently of the reflecting surfaces diameter, which limits the sensitivity. Large fiber MFD is not always practical from a cost, mass, or bend radius perspective. Additionally, a lens permits placement of the fiber and lens at a distance from the reflecting surface significantly greater than the Rayleigh range associated with the fiber MFD. For applications with multiple SPM and optical microscopes in the same object space, this can also prevent mechanical and optical overlap. In the absence of tight focusing or significant aberrations, the electromagnetic field distribution of the incident beam and returning beam remains Gaussian after reflection by mirrors and refraction by lenses, though the beam parameters change. The lens is designed to fill the reflecting surface area in order to yield high efficiency without sacrificing sensitivity. The lens may be mounted separately, but having the lens directly attached to the fiber simplifies the design of the mechanical mount and permits much smaller head dimensions and mass. Several methods exist for creating a lensed fiber based on fusion splicing technology. One method is fusion splicing a graded index lens, such as a short section of graded index multi-mode fiber, to the end of the single mode fiber. A second method is fusion splicing a ball lens to the end of the single mode fiber. A third method is fusion splicing a small section of coreless fiber to the end of the single mode fiber and forming a spherical surface by melting, polishing, or Focused Ion Beam (FIB) milling. FIG. 4, illustrates such a lensed fiber, which would be convenient for matching the MFD of standard communications fiber with a larger reflecting surface.

Figure 5A:
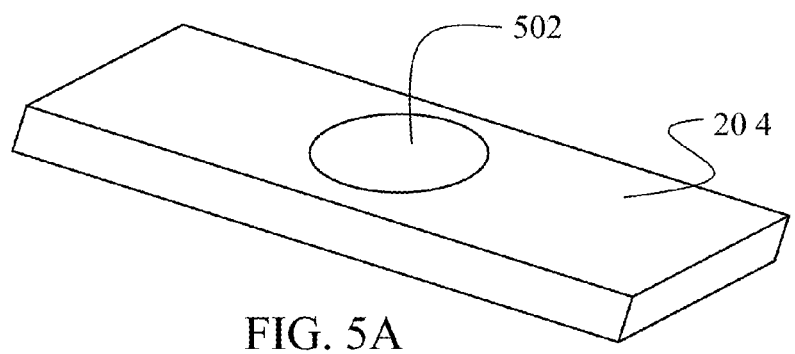
FIG. 5A is a perspective view representation of a first mirror size on the cantilever.
Figure 5B:
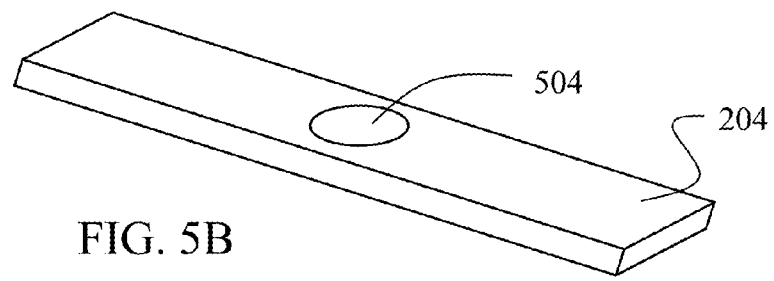
FIG. 5B is a perspective view representation of a second mirror size on a modified cantilever.

The reflecting surface on the cantilever may also be sized to accommodate the spacing of the lensed fiber tip from the cantilever surface. In an exemplary embodiment shown in FIG. 5A, a mirror 502, which may be physically attached to the reflecting surface 204 of the cantilever or create directly on the reflecting surface, is approximately 50 um in diameter. A smaller mirror 504 of approximately 10 um as shown in FIG. 5B matched using manipulation of the lens characteristics and fiber MFD may be employed in alternative embodiments allowing differing cantilever geometry. The cantilever mirror size should be matched to waist radius incident on the mirror to yield high quantum efficiency without sacrificing sensitivity.

Figure 6:
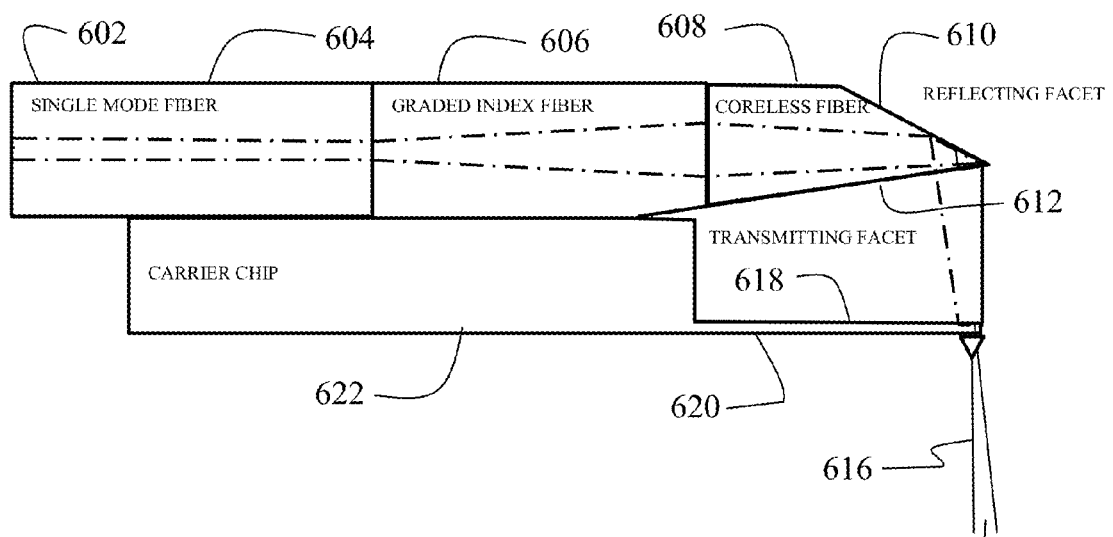
FIG. 6 is a side view representation of a third embodiment of the cantilever rotation SPM head including a graded index fiber lens and a coreless fiber with reflecting and transmitting facets for beam turning.

FIG. 6 illustrates a third embodiment with a configuration where the beam 602 from a single mode fiber 604 is refracted by a graded index multi-mode fiber 606, which serves as the lens. The beam then propagates into a section of coreless fiber 608, where it is reflected at a reflecting facet 610 by either total internal reflection or a metal or dielectric coating, and then refracted through a transmitting facet 612. The angles of facets 610 and 612 are chosen to create the offset angle 614 from the normal 616 of reflecting surface 618 of the cantilever 620. The single mode fiber 604, graded index multi-mode fiber 606 and coreless fiber 608 are mounted relative to the cantilever 620 on a carrier chip 622. The lengths of single mode, graded index, and coreless fibers are chosen to create the appropriate beam size and working distance to match the cantilever reflection surface diameter as previously described. Fabrication of a compound fiber to integrate the single mode fiber 604, graded index multi-mode fiber 606 and coreless fiber 608 is conducted by sequential fusion splicing and cleaving at the appropriate distances. Fabrication of the facets is conducted by mechanical polishing or cleaving thereafter.

Figure 7:
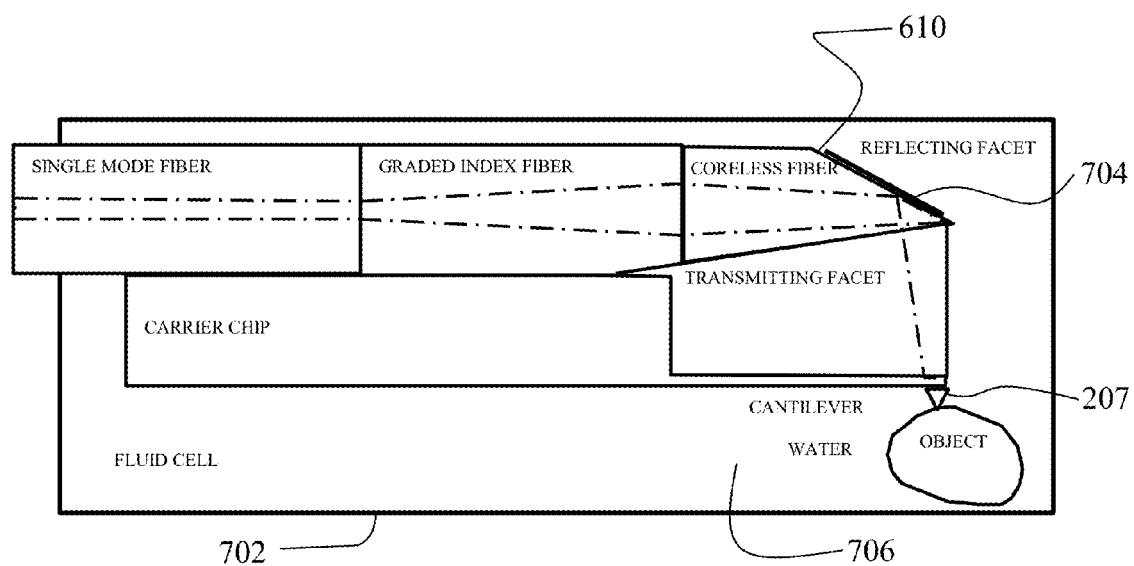
FIG. 7 is a side view representation of a fourth embodiment of the cantilever rotation SPM head immersed in a fluid cell.

FIG. 7 illustrates a similar configuration except that the entire instrument is submerged in water inside of a fluid cell 702, so that an object 700 may be imaged with the probe 207 in-vivo or for purposed of cooling. In this case, a high refection coating 704 is provided on the reflecting facet 610 and the reflection and transmitting facet angles are adjusted to accommodate changes in reflection and refraction due to the non-unity refractive index of the fluid 706.

Figure 8A:
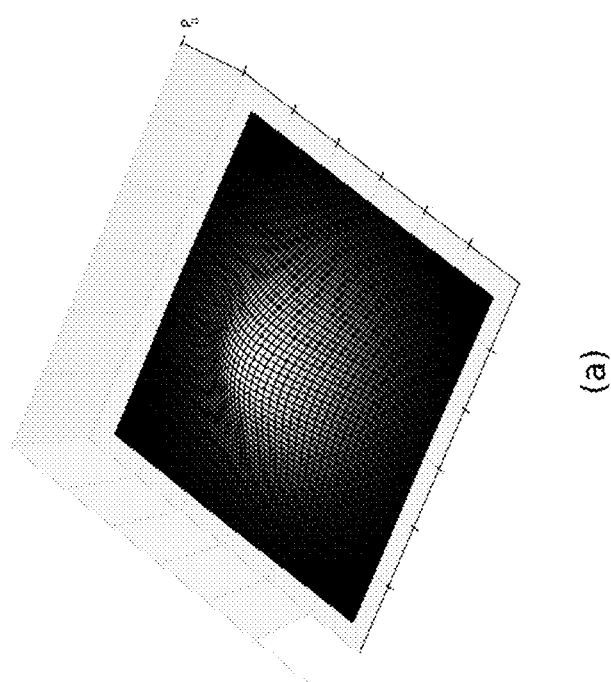
FIG. 8A is a 3 dimensional graph of the Gaussian power function representing that the cantilever mirror surface can tilt in two independent directions represented by spherical coordinate angles (θ,φ), but only has dependency upon the polar angle θ.
Figure 8B:
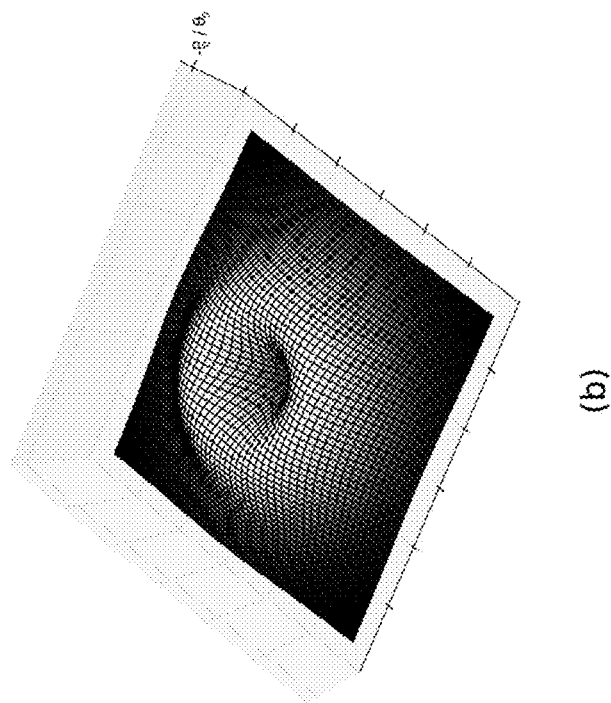
FIG. 8B is a 3 dimensional graph of the derivative of the Gaussian function of FIG. 8A showing change in power per unit of displacement angle (dP/dθ), as a function of spherical coordinate angles (θ, φ)

A reflecting surface on a probe cantilever can tilt in two independent directions, which may be described by spherical coordinates. The power of a reflected beam for embodiments of SPM configurations as described above is strongly dependent on the polar angle ($\theta$) and substantially independent of the azimuthal angle ($\theta$). FIG. 8A shows power and FIG. 8B shows change in power per unit of displacement angle ($dP/d\theta$), as a function of the total angles ($\theta$ and $\phi$). Independently measuring small changes in the angular displacement of the cantilever in both directions is necessary in some applications. The projection of the cantilever displacement angle onto the spherical coordinates involves a rectilinear to circular transform and addition of the angular offsets with respect to beam axis and reflecting surface normal. The offsets determine the small signal magnification value which is then a linear combination of the two cantilever displacement angles. In this manner the cantilever angles cannot be measured independently, and the two values are coupled to determine the resulting polar angle value and therefore power output value. Two separate sets of angular offsets can be achieved by using different wavelengths or polarizations and the dispersive or birefringent nature of the fiber itself or an additional element below the fiber. This would enable independent measuring of the two cantilever displacement angles.

Figure 9A:
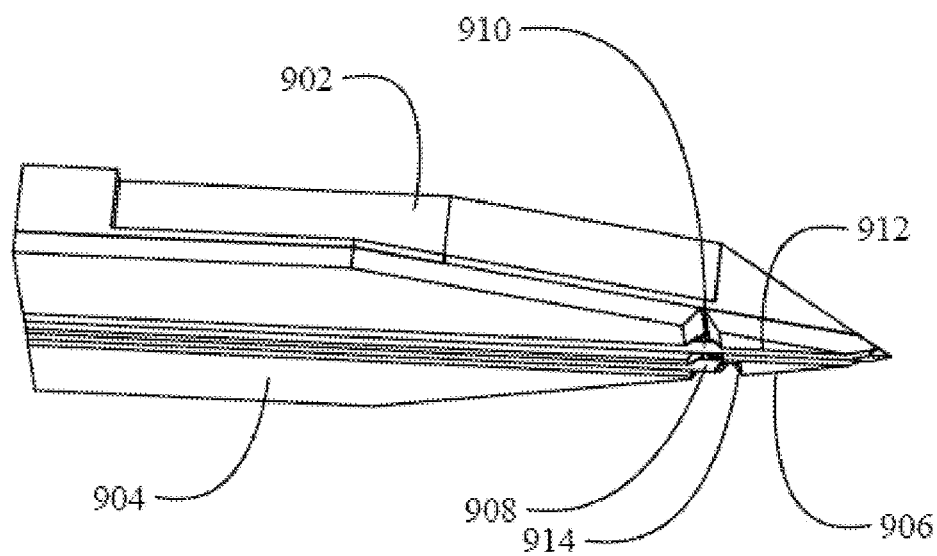
FIG. 9A is an perspective representation of a fifth embodiment incorporating a bending head with a position sense fiber.
Figure 9B:
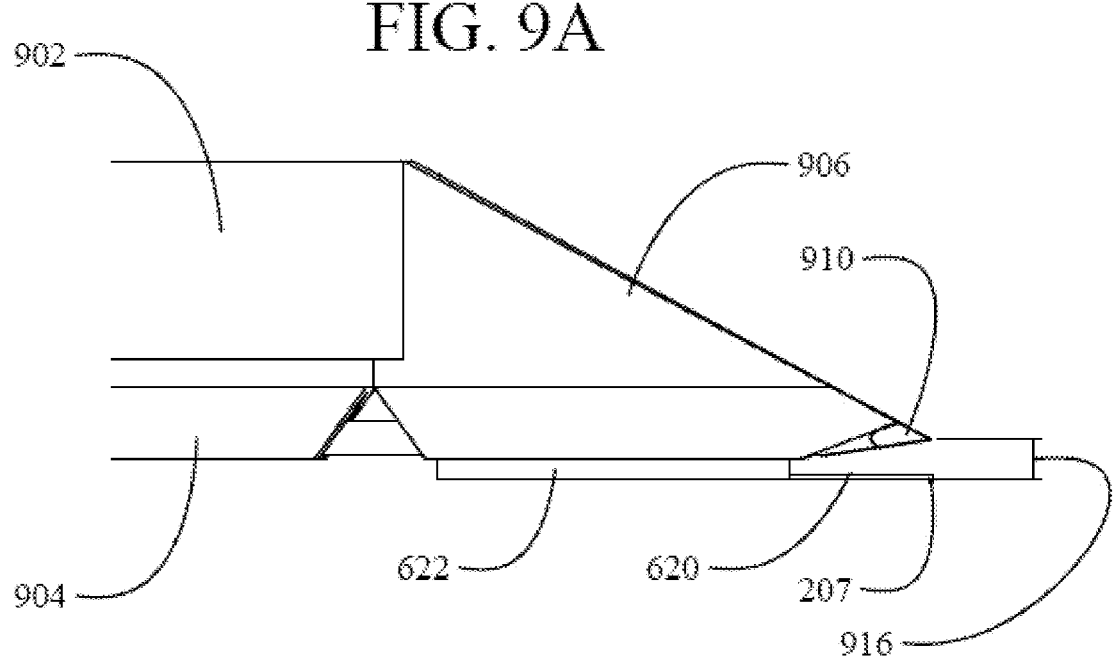
FIG. 9B is a side view of the embodiment of FIG. 9A.

FIGS. 9A and 9B illustrate an exemplary physical embodiment of the SPM head as disclosed herein. A piezoelectric plate bender actuator 902 is attached to a base component 904 and a head component 906. The base component 904 is physically attached to both the plate bender actuator 902 and a position sense fiber 908. The head component 906 mounts an SPM fiber 910 having a configuration substantially as described with respect to FIG. 6 and extending through the based component in a groove 912 and provides a mirror surface 914 to reflect a position sense beam transmitted through the position sense fiber. The position sense beam may be of the interferometric type or the intensity type based on a beam offset, as previously described in the SPM context. A carrier chip 622 supporting a cantilever 620 is mounted to a bottom surface 916 of the head component 906 positioned with respect to the SPM fiber 910 as previously described with respect to FIG. 6. The size of the cantilever mirror typically ranges from 10 um-50 um as previously described. The mode field diameter of the beam is chosen to match the cantilever to maximize the sensitivity and lensing to provide a working distance 916 of at least 100 um permits mounting and removal of the assembly that includes the carrier chip, cantilever, and probe without crashing into the fiber 910. Due to the very short freespace path distance required in the present invention the entire head is approximately 1 mm thick, which permits SPM microscopy and high resolution optical microscopy with high numerical aperture objective lenses with an associated short working distance.

Figure 9C:
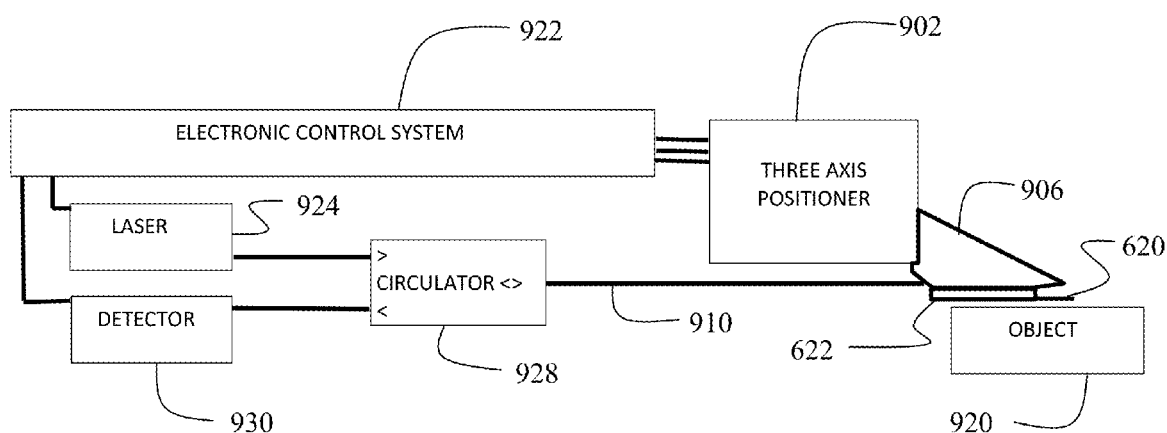
FIG. 9C is a block diagram representation of the microscope system employing the head of FIG. 9A.

As shown in FIG. 9C, the SPM head is incorporated in a head scanning system for imaging of an object 920 wherein the bender 902 provides fast single axis positioning in the z direction and standard piezoelectric positioning in all three axes for the head 906 under the control of an electronic control system 922 to position the carrier chip 622 with the attached cantilever 620 and probe 207. A laser 924 provides a laser beam through an optical circulator 928 to the SPM fiber 910 for reflection from the cantilever reflecting surface as previously described. The reflected beam receive through the SPM fiber is split by the optical circulator and provided to a detector 926 wherein power measurements for the beam may be made and computational routines in the electronic control system may calculate the change in power to determine the displacement angle of the cantilever for control feedback to the positioner.

Figure 1:
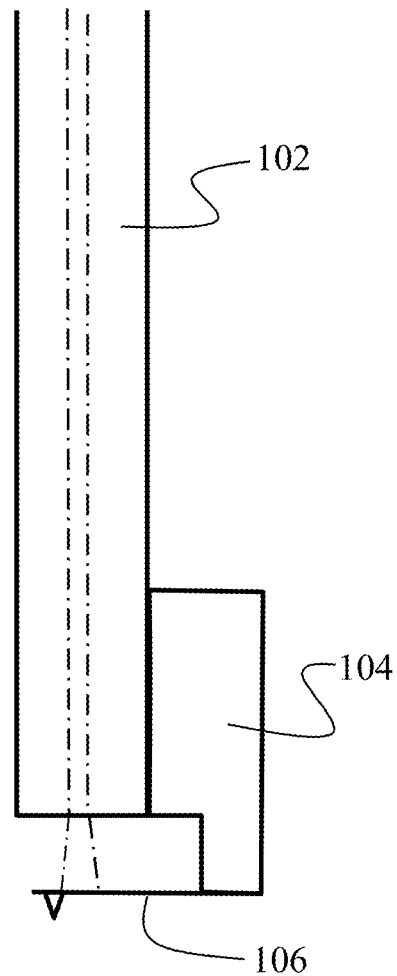
FIG. 1 is a side view representation of a prior art SPM head.
Figure 10:
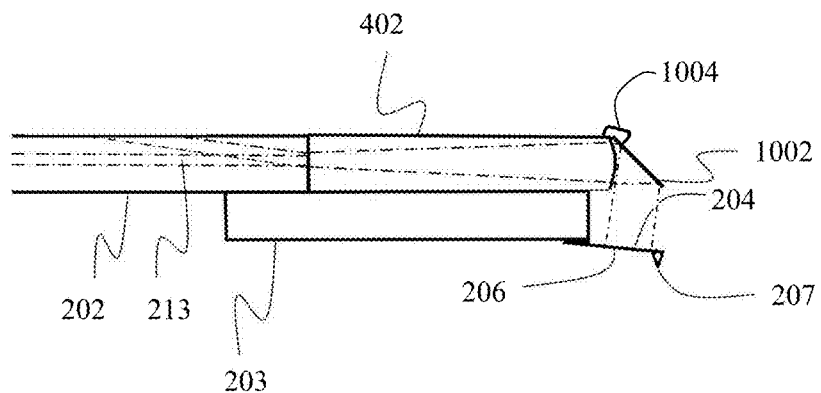
FIG. 10 is a side view representation of an embodiment of a micromirror attached to the fiber for perpendicular reflection of the beam to the reflecting surface on the cantilever.

The prior art shown in FIG. 1 and the first two embodiments shown in FIGS. 2 and 4 have the axis of the fiber 202 close to perpendicular to the cantilever 206. In applications where optical and scanning probe microscopy (SPM) are to be conducted simultaneously under a high numerical aperture objective lens, these SPM designs spatially conflict with the objective lens. The working distance between the object and objective lens, where an SPM can be introduced is often on the millimeter scale. The third embodiment shown in FIG. 6 requires a more complex design in order for the axis of fiber 202 to be close to parallel to the cantilever 206, but it can fit within the working distance of standard high numerical aperture objective lenses. As an alternative to a reflecting facet in the microfiber itself as described with respect to FIG. 6 or mirror surface in a bender element as described with respect to FIGS. 9A-9C, the micro mirror as described with respect to FIG. 5B may be supported at an end of the fiber 202 or the lens 402 or with other structure extending from or adjacent to the mount or the carrier chip. As seen in FIG. 10, a micromirror 1002 is secured to the end of the lens 402 to turn the beam by substantially ninety degrees from the axis 201 of the fiber 202 to be substantially perpendicular to the cantilever 206 allowing transmission of the beam to the reflecting surface and reflection back into the fiber. Dimensions of the micromirror 1002 may be less than 150µ, and nominally 50µ. Such small mirrors can easily be manufactured by micro-electromechanical machining (MEMs) processing. The micromirror may be fabricated with electroforming or electrochemically etched gold foil or it may be constructed by patterning and etching using standard MEMs process as is known in the art. In general, the best coatings for SPM applications would be gold (Au), silver (Ag), or aluminum (Al) but could be formed using a multilayer dielectric mirror or potentially a selective dichroic coating allowing reflection of the force feedback beams while permitting optical transparency at other wavelengths. For the embodiment shown a glue dollop 1004 is used to secure the micromirror 1002 to the end of the lens 402. The micromirror is placed at the desired angle and held until the glue dollop solidifies thereby substantially rigidly supporting the micromirror. The configuration of the mount, fiber, micromirror and cantilever allows mounting room for an objective working distance of less than 10 mm and preferably less than 4 mm for a SEM or other optical system having high NA.

Figure 11:
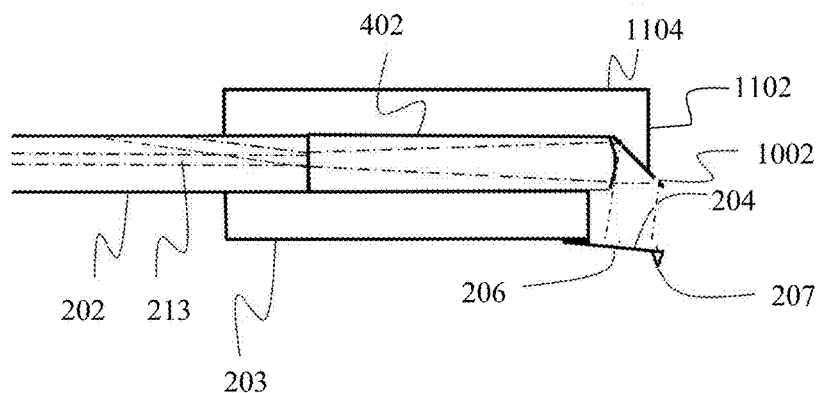
FIG. 11 is a side view representation of a second embodiment of a micromirror attached to the fiber for perpendicular reflection of the beam to the reflecting surface on the cantilever.

A second alternative, as seen in FIG. 11, is also similar to the second embodiment shown in FIG. 4, but mirror 1002 is supported on an arm 1102 extending from a mount 1104 for the fiber, instead of attached to the lens face. In either alternative design the axis of fiber 202 can be made parallel to the cantilever, with adjustment of the angle 1104 of the mirror 1002 to introduce any necessary angular offset for direction of the beam to and reflection from the cantilever. As described with respect to the embodiment of FIGS. 9A-9C, the mount 1104 incorporates a V-groove to accommodate the fiber 202 and lens 402 and when manufactured by MEMs processing can have an angular tolerance that is tight enough to permit introducing the angular offset without an additional angular alignment step.

Figure 12:
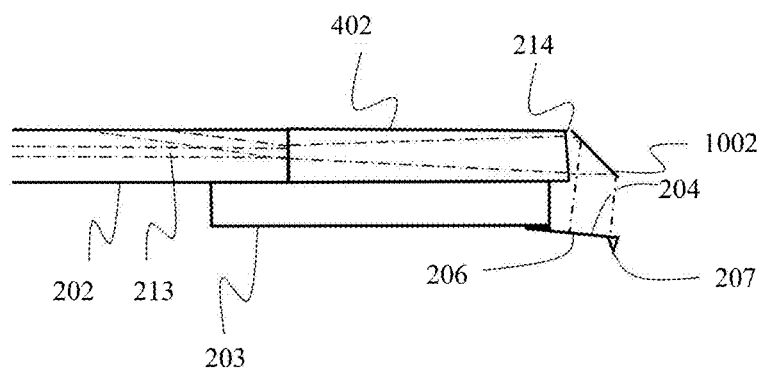
FIG. 12 is a side view representation of a third embodiment of a micromirror attached to the fiber for perpendicular reflection of the beam to the reflecting surface on the cantilever.

A third alternative shown in FIG. 12 is a more specific and preferred embodiment of the alternative described with respect to FIG. 10. The lens 402 in the third alternative is a graded index lens, such as a short section of graded index multi-mode fiber. The fiber facet 214 of the lens 402 is cleaved at a small angle of less than ten degrees, using techniques and equipment that are standard art in fiber optic communications. The method of making the fiber components of the third alternative design is similar to those mentioned for the embodiment of described with respect to FIG. 6. A glue dollop 1004 is used to secure the micromirror 1002 to the end of the lens 402.

Figure 13A:
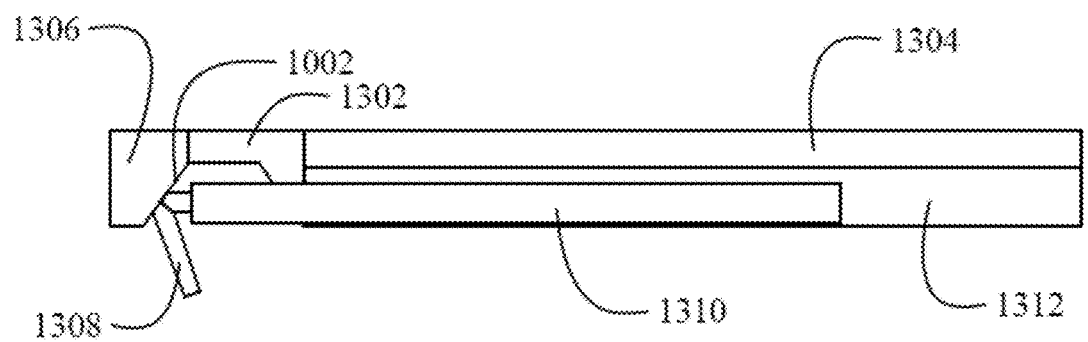
FIG. 13A is a side section view representation of an embodiment of a structure for attaching a micromirror to a fiber for reflection of the beam to the reflecting surface on the cantilever, with the mirror support membrane in an undistorted position.
Figure 13B:
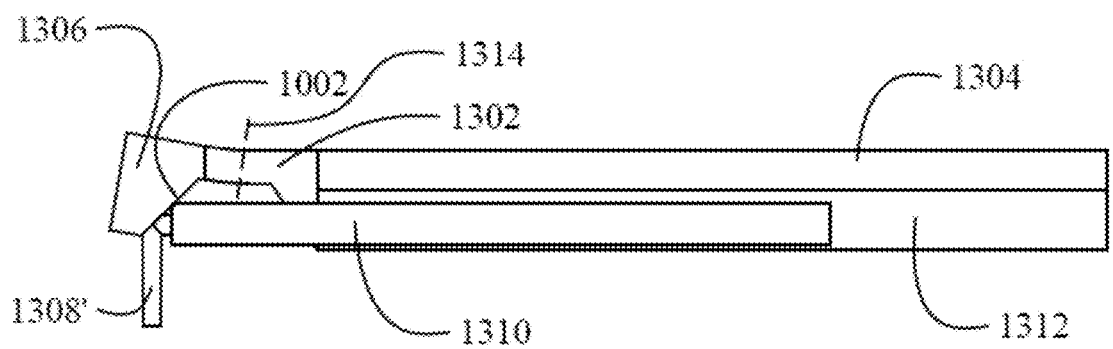
FIG. 13B is a side view representation of the embodiment of the structure for attaching a micromirror to a fiber of FIG. 13A, with the mirror support membrane in a distorted position for adjustment of the beam reflection from the micromirror substantially perpendicular to the fiber.

An exemplary structural embodiment for a method for mounting the mirror in the alternative of FIG. 10 is shown in FIGS. 13A and 13B. A thin membrane 1302 extends from the carrier 1304 to hold a support structure 1306 for the mirror 1002. The angle of the mirror 1002 in this supported position may not provide the desired angular transmission of the beam 1308 emitted from a supported fiber 1310. Using MEMs fabrication techniques, the fiber 1310 is extended in the carrier V-groove 1312 to push on the mirror 1002, as seen in FIG. 13B, to distort the membrane 1302 by twisting or bending thereby placing the mirror 1002 into position so that the beam 1308' projects onto the cantilever at the correct angle. The mirror is then glued to the fiber with a glue dollop 1004 and, after the glue dollop has cured, the membrane is broken or severed, for example along cut line 1314, to relieve any residual stress.

Figure 14A:
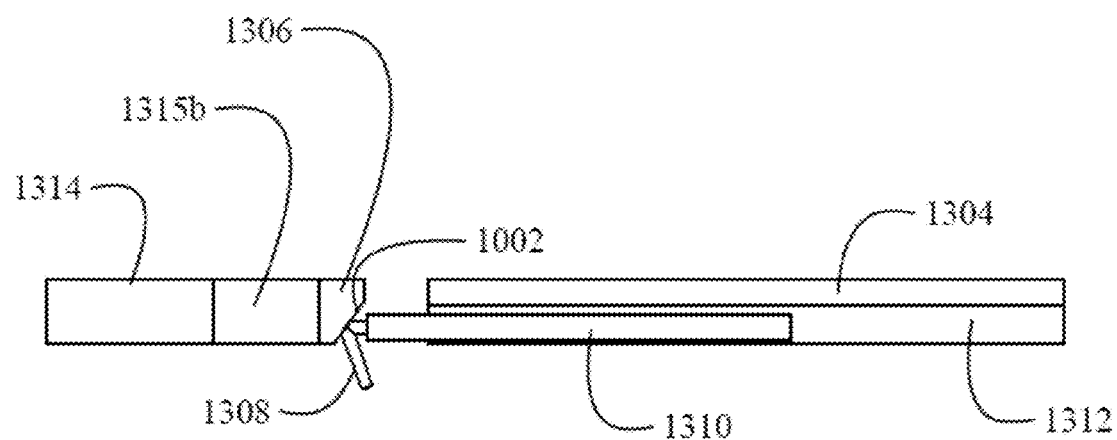
FIG. 14A is a side section view representation of a second embodiment of a structure for attaching a micromirror to a fiber for reflection of the beam to the reflecting surface on the cantilever, with the mirror support membranes in an undistorted position.
Figure 14B:
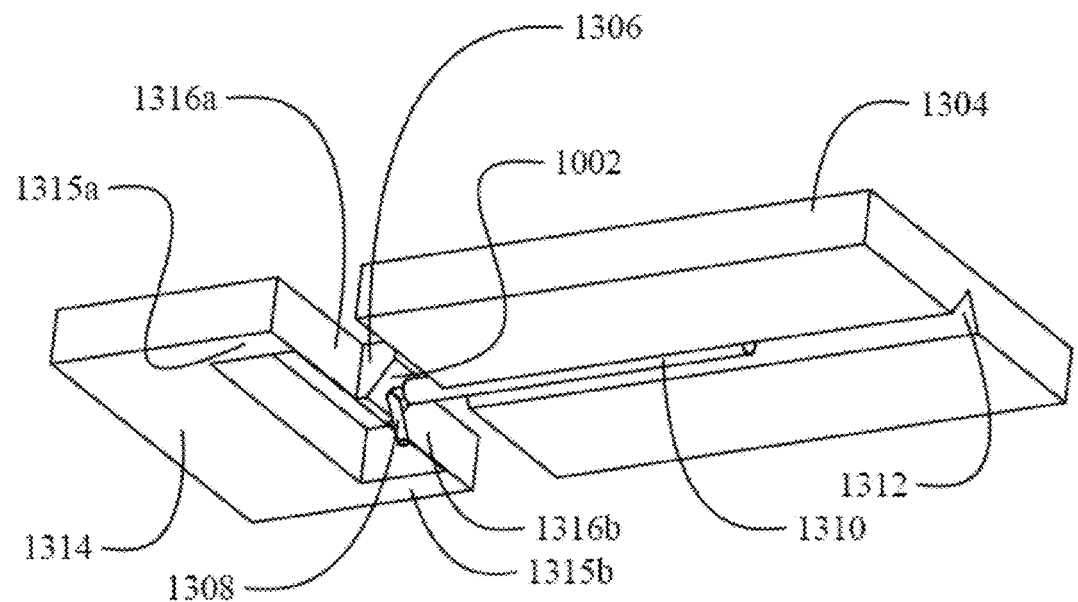
FIG. 14B is a bottom perspective representation of the second embodiment of FIG. 14A.
Figure 14C:
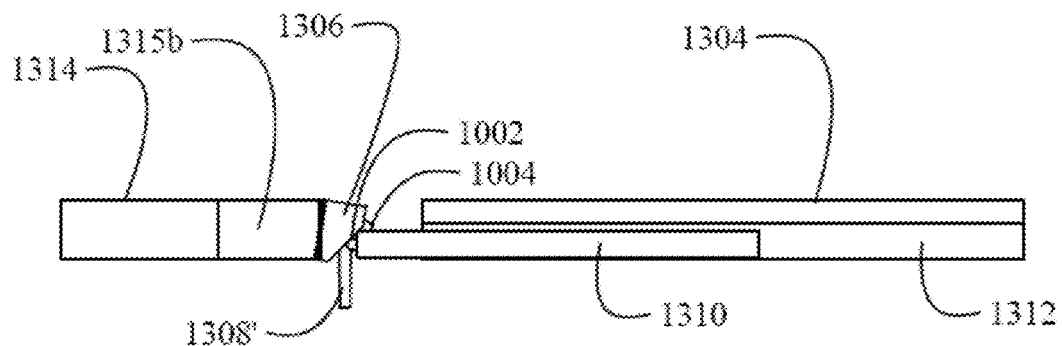
FIG. 14C is a side view representation of the second embodiment of a structure for attaching a micromirror to a fiber for reflection of the beam to the reflecting surface on the cantilever, with the mirror support membranes in a distorted position for adjustment of the beam reflection from the micromirror substantially perpendicular to the fiber; and, FIG. 14D is a top perspective representation of the second embodiment with the support membranes distorted as shown in FIG. 14C.
Figure 14D:
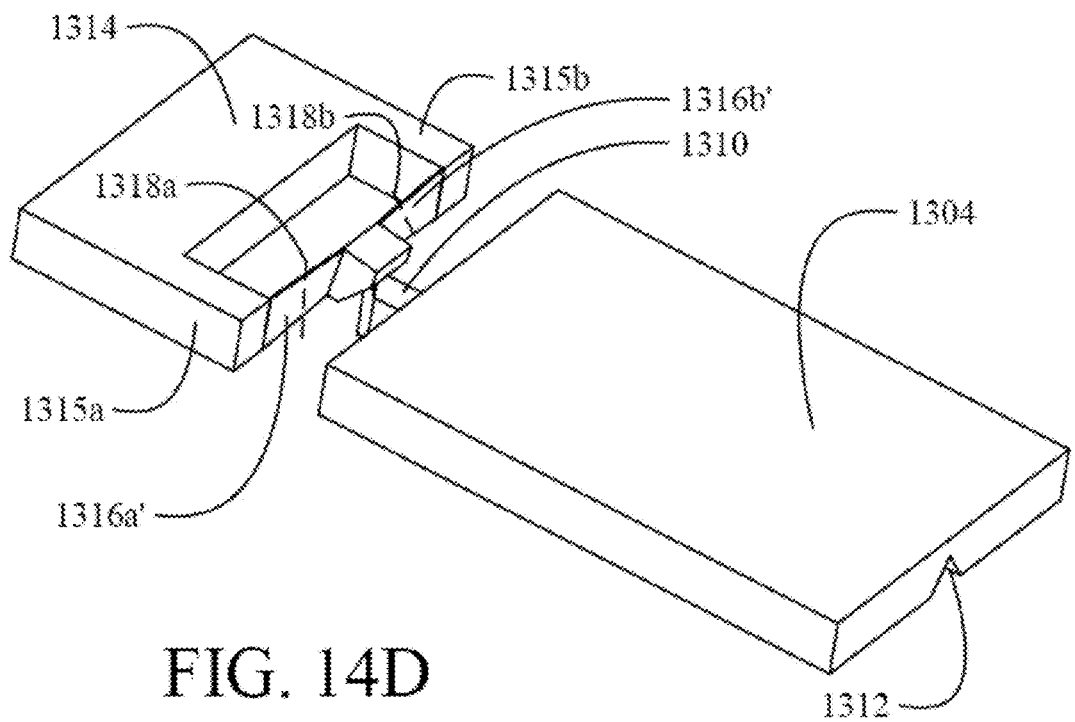

As seen in FIGS. 14A and 14B, the mirror support structure 1306 may also be supported by a secondary support 1314 placed adjacent the carrier 1304 during the fabrication process. Thin membranes 1316a and 1316b extends from arms 1315a and 1315b of the secondary support 1314 to hold a support structure 1306 for the mirror 1002. The angle of the mirror 1002 in this supported position may not provide the desired angular transmission of the beam 1308 emitted from a supported fiber 1310. Using MEMs fabrication techniques, the fiber 1310 is extended in the carrier V-groove 1312 or the secondary support is move into engagement with the fiber for the fiber to push on the mirror 1002, as seen in FIGS. 14C and 14D, to twist or bend the membranes (represented in the deformed condition as elements 1316a' and 1316 b') placing the mirror 1002 into position so that the beam 1308' projects onto the cantilever at the correct angle. The mirror is then glued to the fiber with a glue dollop 1004 and the membrane is broken or severed, for example along cut lines 1318a and 1318b, to relieve any residual stress.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A structure comprising:
  a probe;
  a cantilever on which the probe is mounted, said cantilever having a planar reflecting surface proximate a free end of the cantilever;
  a mechanical mount from which the cantilever extends;
  a single-mode optical fiber; said single-mode optical fiber supported by the mechanical mount to provide a beam, an axis of the optical fiber supported substantially parallel to the cantilever; and,
  a micromirror mounted to reflect the beam substantially 90° to the planar reflecting surface.

2. The structure of claim 1, wherein a lens is disposed between the fiber and micro mirror.

3. The structure of claim 1 wherein the micromirror has a dimension less than 150μ.

4. The structure of claim 1 wherein the micromirror is attached to the fiber with a glue dollop adapted to place the micromirror at an angle with respect to a fiber facet.

5. A method for attaching a micromirror to a fiber in a scanning probe microscopy (SPM) head, said method comprising:
  supporting a micromirror with a membrane proximate a carrier having a V-groove supporting a fiber;
  urging the fiber in the V-groove against the micromirror to deflect the micromirror by distorting the membrane; and,
  gluing the micromirror to the fiber.

6. The method of claim 5 further comprising severing the membrane after curing.

7. The method of claim 5 wherein the membrane is attached to the carrier.

8. The method of claim 5 wherein the membrane is attached to a secondary support adjacent the carrier.

* * * * *